United States Patent
Goto et al.

[11] Patent Number: 5,887,615
[45] Date of Patent: Mar. 30, 1999

[54] CHECK VALVE OF FUEL TANK

[75] Inventors: Hiroshi Goto; Tatuji Ishikawa; Masahide Takisawa, all of Soja; Toshihiro Koyama, Tokyo, all of Japan

[73] Assignee: OM Corporation, Okayama, Japan

[21] Appl. No.: 935,120

[22] Filed: Sep. 22, 1997

[30] Foreign Application Priority Data

Sep. 27, 1996 [JP] Japan ..................... 8-256653

[51] Int. Cl.⁶ .......................................... F16K 15/00
[52] U.S. Cl. .......................... 137/527.6; 137/527
[58] Field of Search ................. 137/527, 527.6; 251/357, 358

[56] References Cited

U.S. PATENT DOCUMENTS

| | | | |
|---|---|---|---|
| 2,877,790 | 3/1959 | Wilhelm et al. | 137/527.6 |
| 5,285,816 | 2/1994 | Herlihy . | |
| 5,301,709 | 4/1994 | Gasaway . | |
| 5,327,933 | 7/1994 | Ishikawa et al. . | |
| 5,355,910 | 10/1994 | Gies et al. . | |

FOREIGN PATENT DOCUMENTS

| | | | |
|---|---|---|---|
| 653896 | 12/1962 | Canada | 137/528.6 |
| 1237280 | 6/1959 | France | 137/527.6 |
| 915410 | 1/1963 | United Kingdom | 137/527.6 |

*Primary Examiner*—Henry A. Bennett
*Assistant Examiner*—Joanne Y. Kim
*Attorney, Agent, or Firm*—Koda & Androlia

[57] ABSTRACT

A check valve using a valve element (2) which is so constructed that the valve element comprises three members: a cover (4); an annular packing (5) and a pressing plate (6), the pressing plate (6) is provided with a snap fit claw (7), a flexible flange (12) pressed to the peripheral edge of a valve seat (11) when the valve element (2) is put in the valve closing state is formed on the outer periphery of the annular packing (5), a peripheral stepped part (13) to which the outer periphery of the pressing plate (6) is fitted is formed on the inner periphery thereof, the cover (4) is provided with a fitting hole (8) for the snap fit claw (7) and a peripheral wall (14) formed on the outer periphery thereof, to which the main body part of the annular packing (5) except the flange (12) is fitted, the annular packing (5) is fitted to the cover (4), the pressing plate (6) is fitted to the annular packing (5), and the snap fit claw (7) is fitted in the fitting hole (8), thereby clamping the annular packing (5) with the cover (4) and the pressing plate (6), in which while the convenience of assembling is kept, the sealing performance in the valve closing state is improved.

5 Claims, 5 Drawing Sheets

CHECK VALVE OF FUEL TANK

BACKGROUND OF THE INVENTION

This invention relates to a check valve of a fuel tank for preventing fuel from flowing in the reverse direction from a fuel tank to an oil filler port in an oil filler pipe.

It is known that in a fuel tank of an automobile or the like, the moment the fuel tank becomes full during feeding, fuel suddenly flows in the reverse direction from the fuel tank to an oil filler port in an oil filler pipe. A check valve is a component which is provided at the end of the oil filler pipe opened to the fuel tank or in the oil filler pipe and put in the closing state except being pushed to open by fuel flowing from the oil filler pipe toward the fuel tank, and for example, cited is the valve in which a valve element having a turning shaft disposed on the valve seat side is energized from the fuel tank side toward an oil filler port by a torsion coil spring. U.S. Pat. No. 5,301,709 is taken as an example of the above type, and in addition, U.S. Pat. No. 5,285,816 and U.S. Pat. No. 5,355,910 have proposed a check valve in which a flat valve comprises two layers, a first soft flexible layer and a second layer of a rigid plastics material, and the hinge part is formed only by the former soft flexible layer.

To accomplish designated operation in the above mentioned structure, the check valve has to satisfy the mutually contradictory requirements for holding down the pressing force of the valve element to the valve seat to be always opened in feeding fuel and for the sealing performance between the closed valve element and the valve seat in fuel reversal. That is, in order to easily open the valve in oil feeding, the energizing force to the valve element has to be held down, and on the contrary, in order to secure the sealing performance in the valve closing state, it is desirable that the energizing force to the valve element is increased to press the valve element to the valve seat. Especially the sealing performance in the valve closing state is important for fuel slowly flowing in the reverse direction due to increase in pressure in the fuel tank after the fuel tank is made full by oil feeding.

U.S. Pat. No. 5,301,709 shows a check valve (corresponds to a check valve of the present invention) having a pair of semicircular valve discs with openings, in which a seal material press-contacting the valve element in the valve closing state is formed on the peripheral edge of the valve seat to mainly improve the sealing performance in the valve closing state. The check valve, however, has the problem that the structure is so complicated as to cost high and be inferior in assembling efficiency.

Accordingly, the inventors of the present invention have previously proposed one disc type valve plate improved in assembling efficiency and fitting efficiency, which is provided on the end of an oil filler pipe in a fuel tank in U.S. Pat. No, 5,327,933. On the basis of the above proposal, the present invention has examined the structure of a new check valve of such a type as to be installed in the interior of a pipe, which is not inferior in assembling efficiency and improved in sealing performance in the valve closing state.

SUMMARY OF THE PRESENT INVENTION

A check valve of the present invention is a valve which is put in the closing state except oil feeding time to prevent fuel from flowing in the reverse direction from a fuel tank toward an oil filler port in an oil filler pipe and so constructed that a valve element of the valve comprises three members: a pressing plate; an annular packing and a cover, further the pressing plate or the cover is provided with locking means for assembling each other, a flexible flange pressed to the peripheral edge of a valve seat when the valve element is put in the closing state is formed on the outer periphery of the annular packing, a peripheral stepped part to which the outer periphery of the pressing plate is fitted is formed on the inner periphery thereof, a peripheral wall to which the main body part of the annular packing except the flange is fitted is formed on the outer periphery of the cover, the annular packing is fitted to the cover, the pressing plate is fitted to the annular packing, and the annular packing is clamped with the cover and the pressing plate to be integrated by the above locking means.

To be concrete, the pressing plate is provided with a snap fit claw, a flexible flange pressed to the peripheral edge of a valve seat when a valve element is put in the closing state is formed on the outer periphery of an annular packing, a peripheral stepped part to which the outer periphery of the pressing plate is fitted is formed on the inner periphery thereof, the cover is provided with a fitting hole for the snap fit claw, a peripheral wall to which the main body part of the annular packing except the flange is fitted is formed on the outer periphery of the cover, the annular packing is fitted to the cover, the pressing plate is fitted to the annular packing, the annular packing is clamped with the cover and the pressing plate by fitting the snap fit claw in the fitting hole, or a projection is provided on the pressing plate instead of the snap fit claw, and the vicinity of the tip of the projection projected from the fitting hole is welded or bonded to the cover, thereby clamping the annular packing with the cover and the pressing plate to integrate these three members with one another. Heat welding, ultrasonic welding, oscillating welding and so on are used for welding.

The locking means for three members may be formed by combination of a screw and a fitting hole in addition to the above, and for example, elements of the locking means may be arranged in the reverse relationship in such a manner that a snap fit claw is provided on a cover and a fitting hole is provided in a pressing plate.

In the thus constructed check valve, the valve element is provided with a turning-hole passing a turning shaft positioned and fixed to the valve seat side, so that the valve element is journalled to the valve seat side, the turning hole is an elongated hole directed orthogonal to the valve seat in the valve closing state, or one end of a torsion coil spring installed on the turning shaft for energizing the valve element in the closing direction is brought into contact with the valve seat side, and the other end is fitted in a slot of a snap fit claw projected from the cover or a locking groove provided near the tip of the projection, thereby fitting and positioning the torsion coil spring. It is desirable that the elongated hole is about the size of extending from the position where the valve element starts to turn in the opening direction with the flange of the valve element brought into contact with the valve seat a little backward to the valve seat.

According to the present invention, a flexible flange formed on the outer periphery of an annular packing of a valve element is projected from the outer periphery of a cover, whereby in the valve closing state, the flange is deformed to be brought into fact contact with the peripheral edge of the valve seat so that the sealing performance is high and even if the pressing force for energizing the valve element in the closing direction is weak, satisfactory sealing performance can be secured, and the pressing force can be lowered so as to increase the opening and closing response speed of the valve element. Further, the annular packing is clamped with the cover and the pressing plate, and only the flexible flange of the outer periphery peeps out from the outer periphery of the cover to protect the substantially whole area, so that even if it is subjected to collision of fuel flowing in during oil feeding and fuel flowing in the reverse direction, it will not be deformed so as to form a structurally strong valve element.

In a check valve adapted to open and close by turning a valve element, the valve element is provided with a turning hole passing a turning shaft positioned and fixed to the valve seat side, whereby the valve element is journalled to the valve seat side, and the turning hole is an elongated hole directed orthogonal to the valve seat in the valve closing state, whereby while the flange is further deformed by the pressing force of a torsion coil spring or the like for energizing the flange in the closing direction immediately after valve closing from the state of being pressed to the peripheral edge of the valve seat, it is pressed to the valve seat so that the deformed flange is widely brought into face contact with the peripheral edge of the valve seat so as to heighten the sealing performance. If the elongated hole is about the size of extending from the position of enabling turning movement with the flange of the valve element brought into contact with the valve seat a little backward to the valve seat, while the whole periphery of the flange is kept in the state of being uniformly pressed to the peripheral edge of the valve seat, it can be straightly pressed to the valve seat so as to exhibit stable sealing performance.

In assembling a valve element, it is enough only to fit the annular packing to the cover, fit the pressing plate to the annular packing, and fit the snap fit claw as locking means in the fitting hole, or weld the vicinity of the tip of a projection projected from the fitting hole on the cover, thereby clamping the packing with the pressing plate and the cover, and as the assembling relationship among the respective members is univocally determined, the assembling work can be very simplified. In the case of using a torsion coil spring for energizing the valve element, one end of the torsion coil spring is fitted to a slot provided in the snap fit claw or a locking groove provided on the vicinity of the tip of the projection, whereby the assembling relationship of the torsion coil spring to the valve element can be also simply determined so as to further simplify the assembling work. Especially, if the fitting hole of the cover is taken in the center of gravity of the valve element, the pressing force applied from one end of the torsion coil spring fitted in the snap fit claw or projection is uniformly applied to the whole periphery of the flange so as to accomplish high sealing performance of the valve element, and according to the present invention, it is possible to easily realize the best assembling relationship of the valve element and the torsion coil spring as described above.

DETAILED DESCRIPTION OF THE INVENTION

The embodiments of the present invention will now be described in the following.

Figure 1:
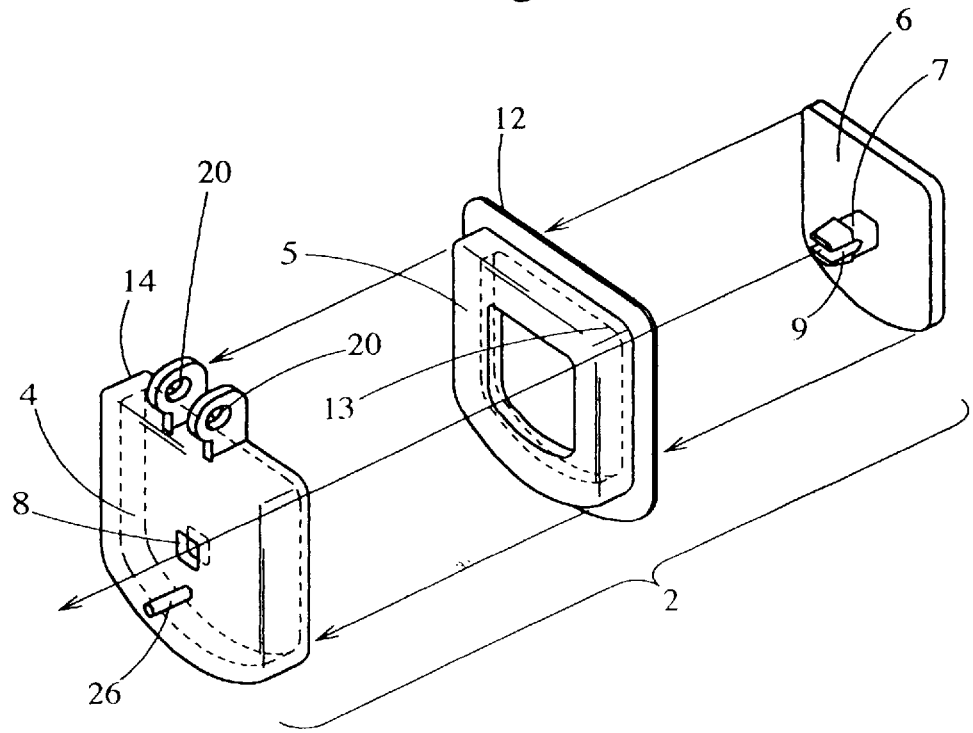
FIG. 1 is an exploded perspective view of a valve element of a check valve according to the present invention.
Figure 2:
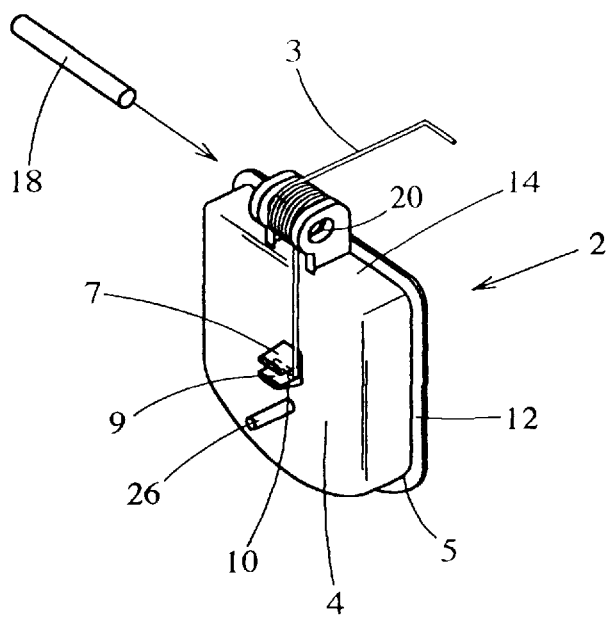
FIG. 2 is a perspective view showing the assembling relationship between the valve element and a torsion coil spring.

As shown in FIG. 1, a valve element 2 comprises three members: a cover 4; an annular packing 5 and a pressing plate 6, which are assembled with one another in fitting relationship to be integrated by fitting a snap fit claw 7 of the pressing plate 6 in a fitting hole 8 of the cover 4. The snap fit claw 7 and the fitting hole 8 form locking means in pair. The appearance shape of the integrally assembled valve element is shown in FIG. 2, and the fitting condition of these three members is shown in a sectional view of FIG. 5. The end part 10 of a torsion coil spring 3 for energizing the valve element 2 in the closing direction is fitted to a slot 9 provided in the snap fit claw 7, thereby determining the relationship between the valve element 2 and the torsion coil spring 3, that is, vertically and laterally positioning the valve element 2.

The respective parts for forming the valve element 2 will be described further in detail with reference to FIG. 1.

The annular packing 5 for determining the sealing performance of the valve element 2 is substantially in the form of a rectangular ring, only the lower side of which is in the form of a circular-arc, a flexible flange 12 pressed to the peripheral edge of a valve seat 11 (See FIG. 5 and the followings) is formed on the outer periphery, and a peripheral stepped part 13 to which the pressing plate 6 is fitted is formed on the inner periphery.

The pressing plate 6 is substantially in the form of a rectangle, only the lower side of which is like a circular-arc, and has such a structure that a snap fit flaw 7 substantially rectangular in section is projected from the center thereof. The reason why the snap fit claw 7 is made in the form of a rectangle in section is that correct positioning of the pressing plate 6 to the cover 4 is intended and assembling in the wrong direction is reduced. In order to perform correct positioning, in addition to the above method of making the sectional form of the snap fit claw polygonal, a projection in the assembling direction is formed on the snap fit claw or a recessed groove corresponding to the fitting hole of the cover is formed thereon.

Figure 9:
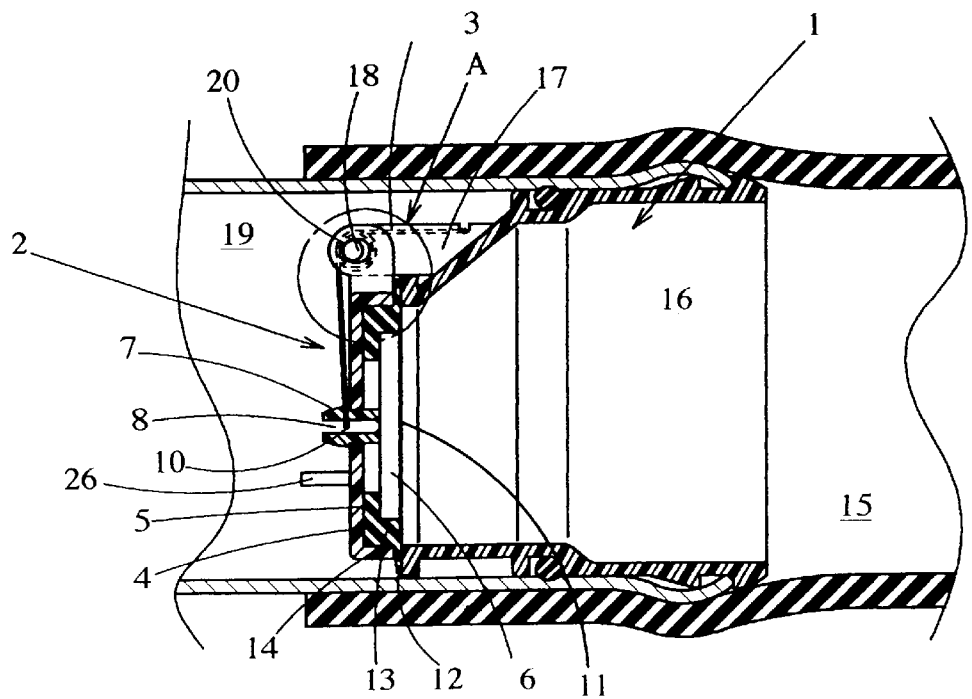
FIG. 9 is a sectional view similar to that of FIG. 7 showing the condition where a valve element is pushed in from the state of FIG. 7 by a torsion coil spring so that the whole periphery of a flange is brought into contact with the peripheral edge of the valve seat.

The cover 4 is substantially rectangular in shape similarly to those of the above members, a fitting hole 8 to which the snap fit claw 7 is fitted is provided in the center, a protective projection 26 is provided in the vicinity of the fitting hole 8, a peripheral wall 14 to which the annular packing 5 is fitted is formed, and a pair of turning shaft bearing holes 20,20 are provided on the upper edge in such a manner as to leave space therebetween for permitting the coil part of the torsion coil spring 3 to fit. The protective projection 26 is adapted to collide with the floor surface earlier than the snap fit claw 7 when the assembled valve element 2 is dropped, so that the snap fit claw 7 is kept from a direct impact not to slip off, and made longer than the snap fit claw 7 projected from the cover 4. The turning shaft bearing hole 20 is an elongated hole extending from the position where the valve element 2 starts to turn in the opening direction with the flange 12 brought into contact with the valve seat (See FIG. 9) a little backward to the valve seat 11.

The snap fit claw 7 is provided with a slot 9, and as shown in FIG. 2, one end 10 of the torsion coil spring 3 for energizing the valve element 2 in the closing direction is fitted therein to determine the assembling relationship between the valve element 2 and the torsion coil spring 3. Especially, in the present embodiment, the snap,fit claw 7 is projected from the center of the cover 4, so that the torsion coil spring 3 presses the center of the valve element 2. Thus, force uniform in the radial direction is applied to the valve element 2 to eliminate drift of a track caused by biasing force at the time of opening and closing the valve.

Figure 3:
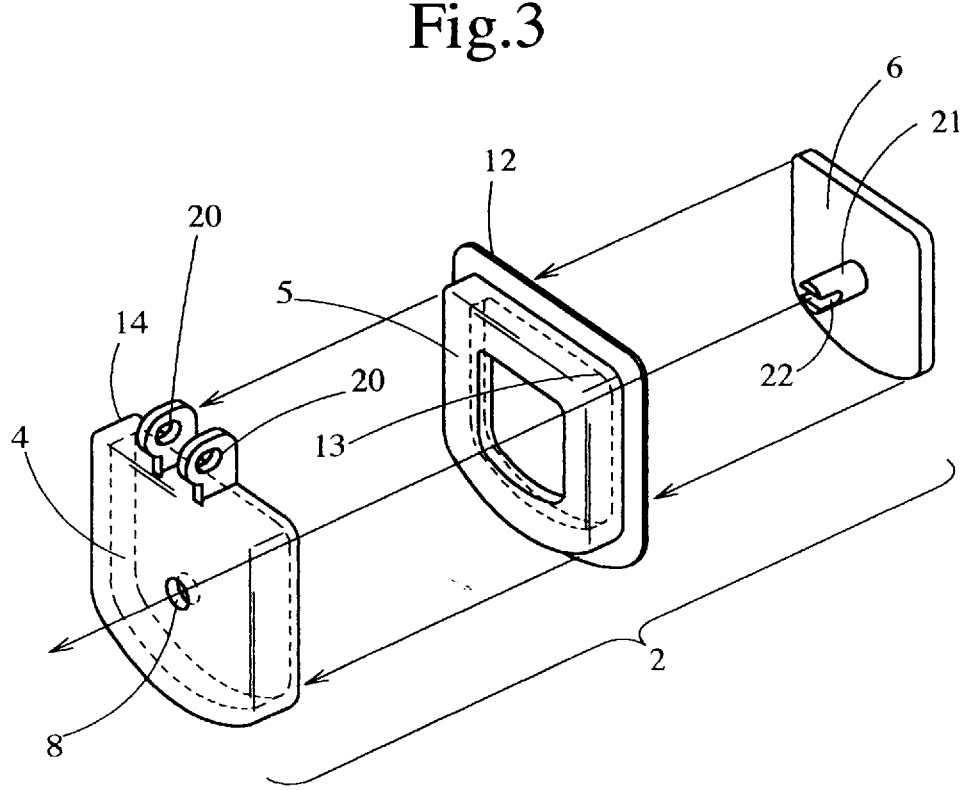
FIG. 3 is an exploded perspective view of a valve element, in which a projection is provided on a pressing plate.

In the embodiment shown in FIG. 3, when the cover 4, the annular packing 5 and the pressing plate 6 are combined, the vicinity of the tip of a projection 21 is projected from the fitting hole 8 of the cover 4, and the projected part is bonded in a space up to the periphery of the fitting hole 8 by welding or with an adhesive agent, thereby accomplishing integration as a valve element 2. In the vicinity of the tip of the projection 21, there is provided a locking groove 22 similar to the slot 9 of the snap fit claw 7, thereby determining the assembling relationship between the valve element 2 and the torsion coil spring 3 by fitting one end 10 of the torsion coil spring 3 therein.

Figure 4:
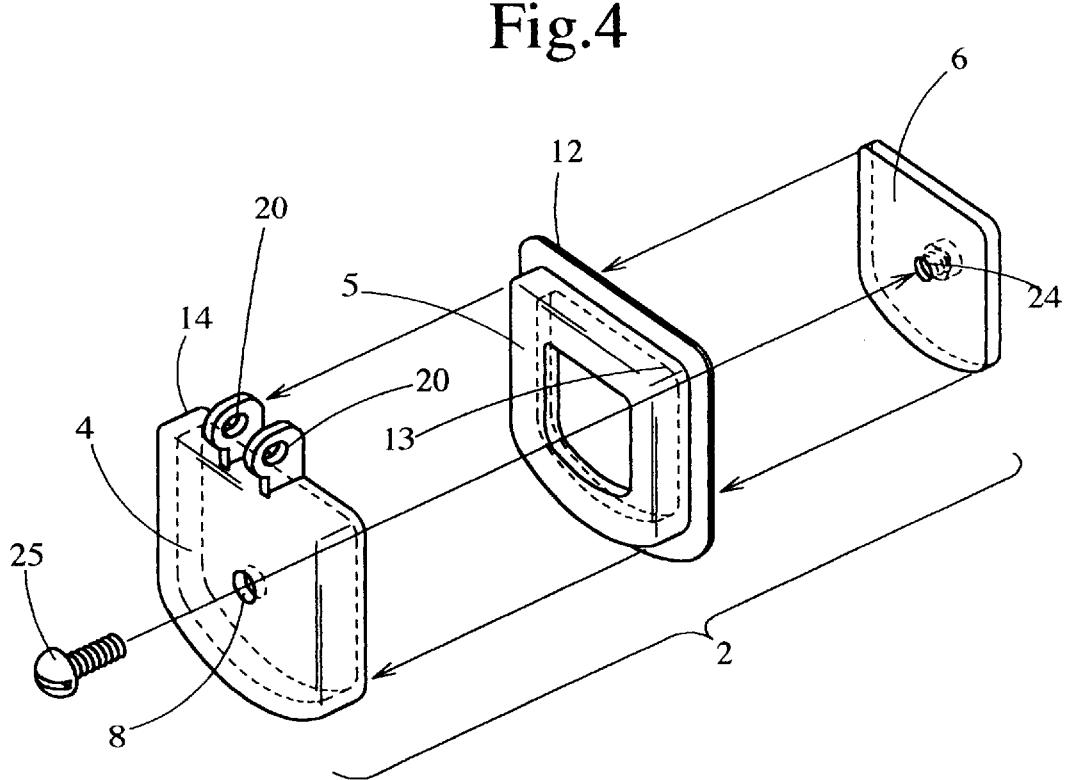
FIG. 4 is an exploded perspective view of an example in which a screw opening is formed in the pressing plate to form locking means using screwing.

In the embodiment in FIG. 4, a screw 25 is screw-fitted in from the fitting hole 8 of the cover 4 toward a screw opening 24 of the pressing plate 6, so that assembling of the cover 4 and the pressing plate 6 is accomplished by screwing. In this case, in order to prevent leakage due to penetration of fuel, it is important that a non-through screw opening 24 is provided in the center of the pressing plate 6 not to provide a gap communicating extending from the cover 4 to the pressing plate 6. Further, the fitting hole may be provided in the pressing plate, the snap fit claw or the projection may be provided in the cover, the screw may be screw-fitted from the pressing plate toward the screw opening of the cover. Though the elements of locking means may be thus disposed in the reverse relationship, similarly to the above, there is no gap communicating extending from the cover to the pressing plate.

Figure 5:
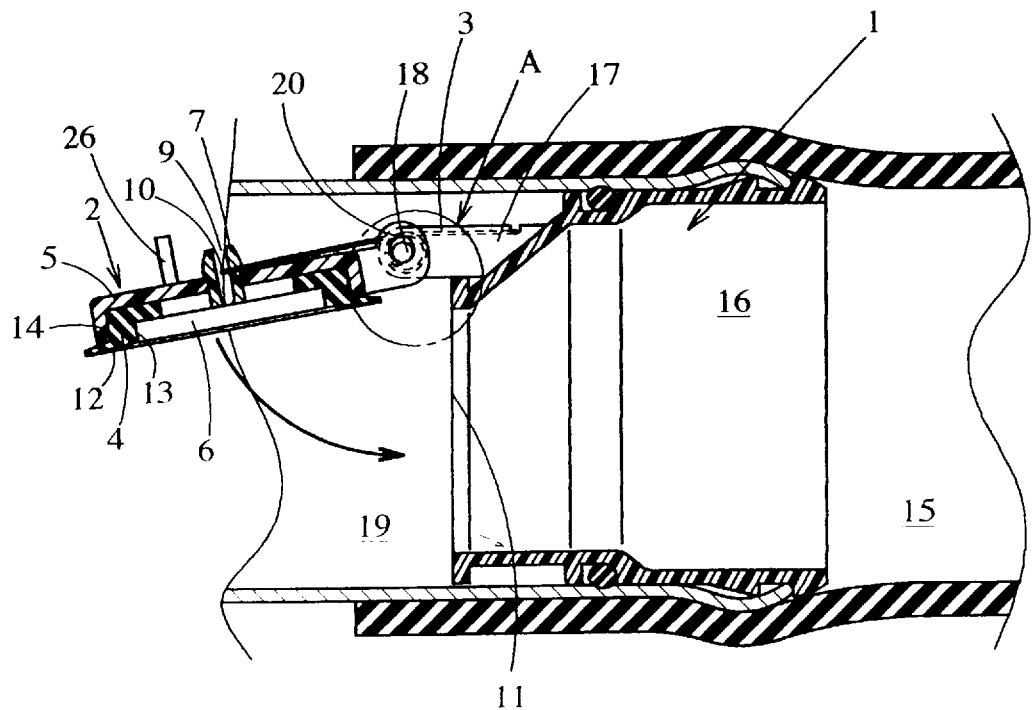
FIG. 5 is a sectional view showing the valve opening state, which is an example of installing a check valve using the valve element of FIG. 1 in an oil filler pipe.
Figure 6:
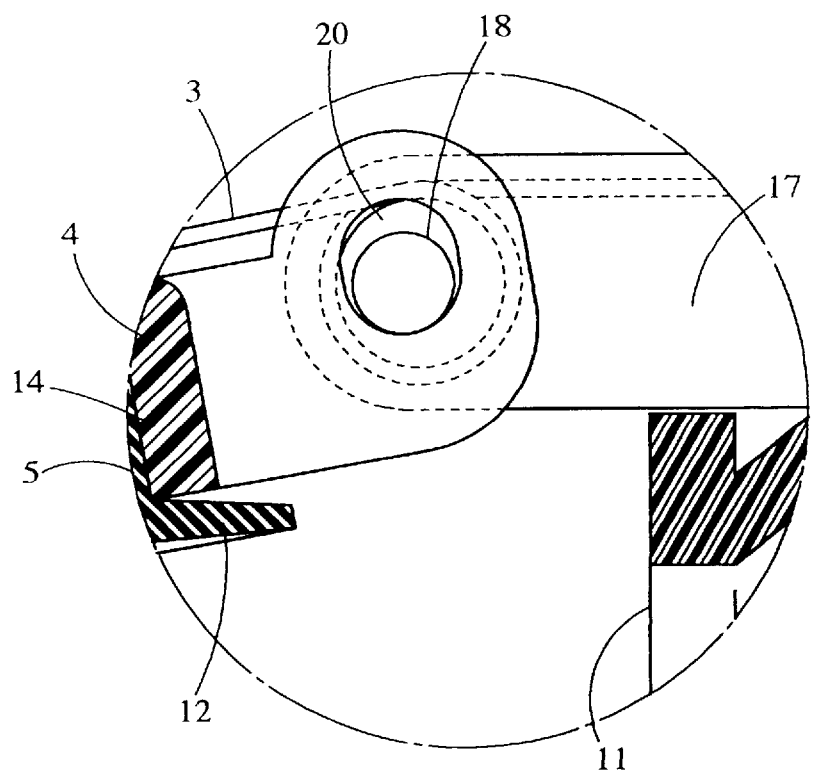
FIG. 6 is an enlarged view of a part A in FIG. 5.

The general structure of the check valve 1 of the present embodiment will be described with reference to FIG. 5. The check valve 1 of the present invention is so constructed that the fuel tank side (left side in the drawing) of a substantially annular main body 16, both ends of which are opened, is taken as the valve seat 11, the base 17 is integrally formed on the main body 16, and both end sides of a turning shaft 18 are respectively passed through turning shaft bearing holes 20,20 to journal the valve element 2 to the valve seat side. Further, the torsion coil spring 3 for energizing the valve element 2 in the closing direction is installed on the turning shaft 18 in such a manner as to be clamped between the turning shaft bearing holes 20,20. A fuel path from an oil filler port (not shown) to a fuel tank is so constructed that a check valve 1 having a valve element 2 is, as described above, is fitted in an oil filler main pipe 19 extended from the fuel tank, and further the oil filler main pipe 19 itself is covered with an oil filler pipe 15. As it will be apparent from FIG. 5, the check valve 1 is opened only to the fuel tank, so that the valve is put in the closing state (See FIG. 7) except that it is pushed up to be open by fed fuel, thereby preventing fuel flowing in the reverse direction from overflowing to an oil filler port.

A snap fit claw 7 is projected from the cover 4 substantially in the center, that is, on the center of gravity of the valve element 2 which is substantially in the form of a rectangle, only the lower side of which is like a circular arc in the present embodiment, whereby the pressing force of the torsion coil spring 7 for fitting the end part 10 in a slot 9 of the snap fit claw 7 is equally applied to the whole of the valve element 2 so as to smooth valve opening and closing operation. As described later, the above pressing force is also applied equally to the whole periphery of a flange 12, so that the sealing performance in the valve closing state is made stable. The check valve 1 of the present invention is, as described above, characterized in that assembling can be more simplified while high sealing performance and opening and closing stability are achieved.

Figure 7:
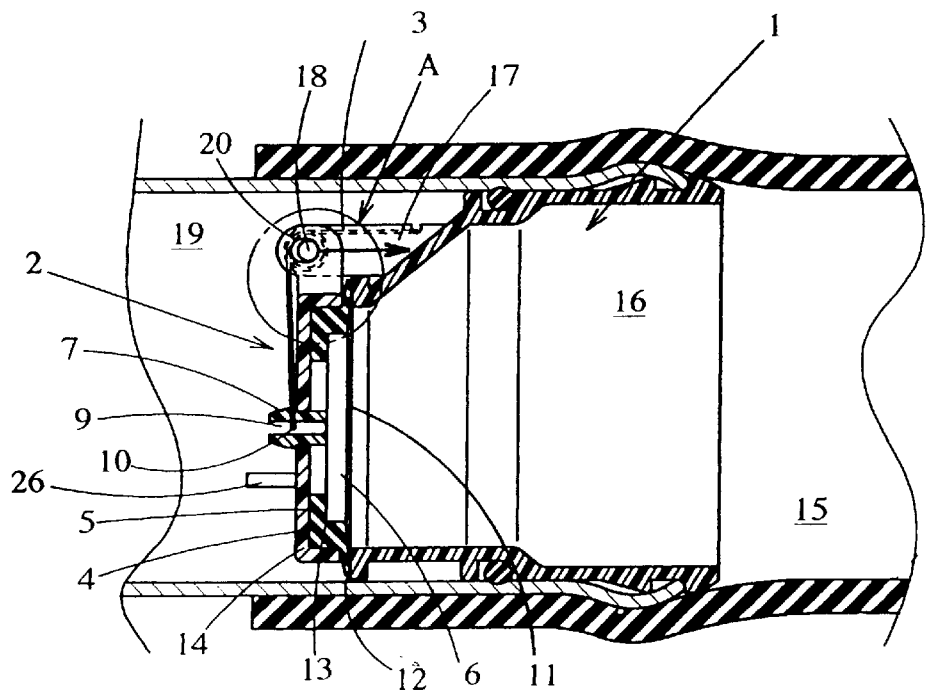
FIG. 7 is a sectional view similar to that of FIG. 5 showing the condition where the valve element is turned from the state of FIG. 5 to close the valve and a flange is brought into contact with the peripheral edge of the valve seat.
Figure 8:
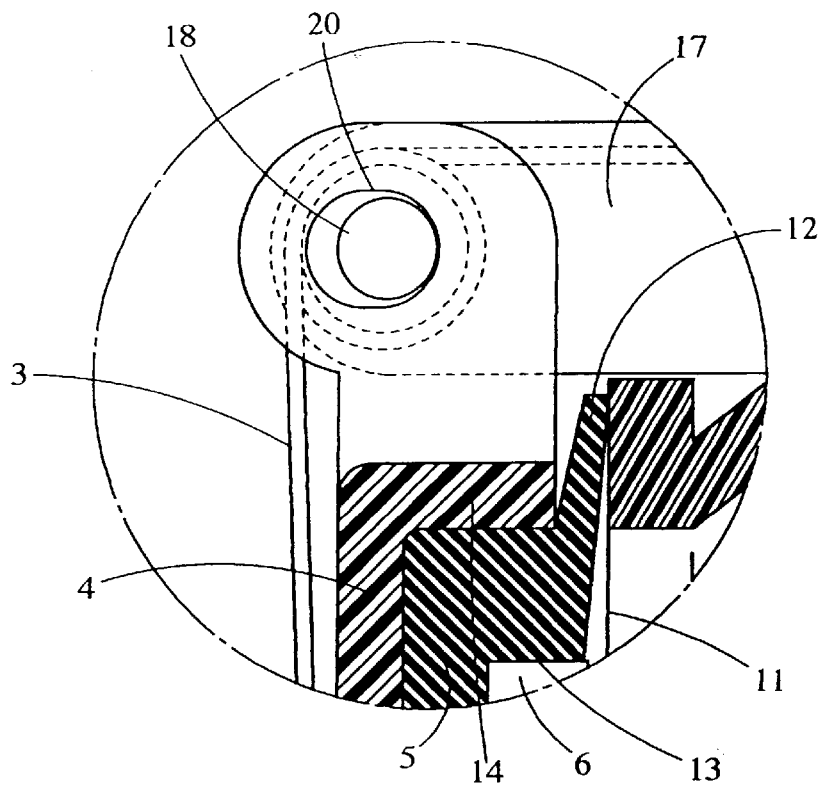
FIG. 8 is an enlarged view of a part A in FIG. 7.

When the pressure in the valve opening direction produced by fuel directed to the fuel tank is out after oil feeding, the valve element 2 is turned in the closing direction by energization of the torsion coil spring 7 to bring the flange 12 into contact with the peripheral edge of the valve seat 11 (See FIG. 7). As shown in FIG. 8, in such a condition, the tip of the flange 12 is quickly brought into contact with the valve seat 11 to be put in the valve closing state, and as the turning shaft bearing hole 20 is an elongated hole, the valve element 2 can be further pushed in by the pressing force of the torsion coil spring 7, so that the flexible flange 12 is pressed to the valve seat 11 and deformed so as to obtain higher sealing performance (Compare FIG. 8 with FIG. 10).

The valve element 2 further pushes the flexible flange 12 toward the valve seat 11 while deforming it with the pressing force of the torsion coil spring 7 so as to heighten the sealing performance. The reason why the turning shaft bearing hole 20 is an elongated hole is that the stroke required for forcing the torsion coil spring 7 is secured, so the extending direction of the elongated hole is set from the position where the valve element can turn with the flange 12 brought into contact with the valve seat 11 (See FIG. 9) a little backward to the valve seat 11. Further, as one end of the torsion coil spring 7 presses the center of gravity of the valve element 2, uniform pressing force can be applied to the whole periphery of the flange 12 so as to accomplish stable sealing performance.

Figure 10:
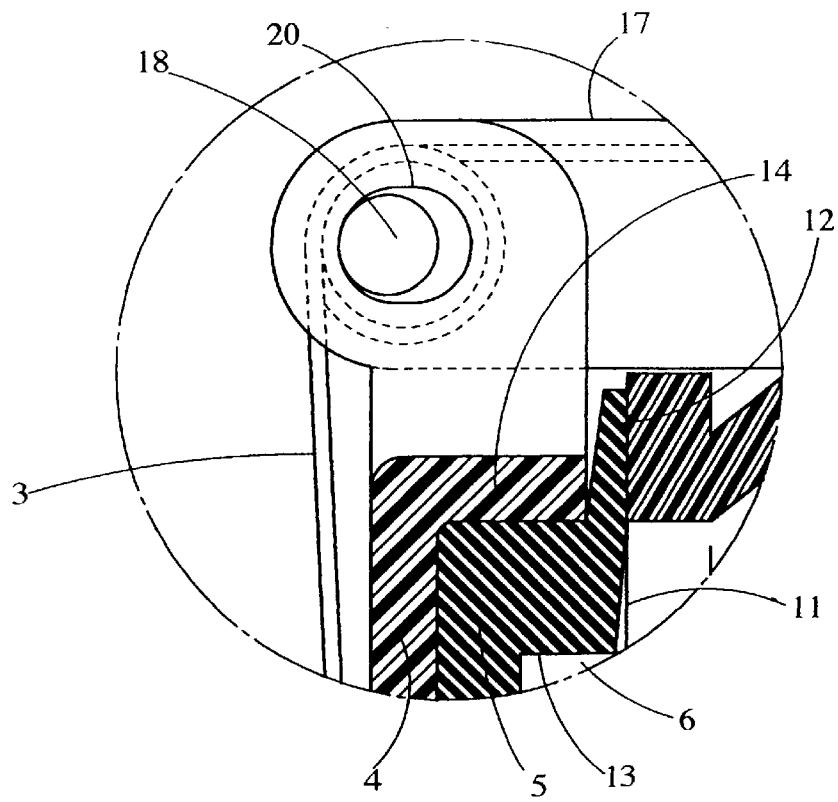
FIG. 10 is an enlarged view of a part A in FIG. 9.

A part of the valve element 2 that is pressed to the peripheral edge of the valve seat 11 is, as shown in FIG. 10, a fin-like flexible flange 12 which is inclined to the valve seat 11. The thin type flexible flange 12 as in the present embodiment is excellent especially in flexibility and gently bent from the part pressed to the peripheral edge of the valve seat 11, so that the whole periphery of the flange 12 can be brought into close face contact with the peripheral edge of the valve seat 11, and even if the force of the torsion coil spring 3 is small, satisfactory sealing performance can be accomplished. Further, it is enough to make the force of the torsion coil spring 3 smaller, which results in the advantage that the force required for opening the valve may be lessened and the valve can be pushed by fuel flowing in during oil feeding to be quickly opened.

The check valve of the present invention has the advantage that it has such a structure as to heighten the assembling efficiency and fitting efficiency on the one hand and on the other hand, it is improved in sealing performance in the valve closing state to intercept fuel suddenly flowing in the reverse direction from a fuel tank toward an oil filler port, and also prevent fuel from oozing out from a gap between a valve element and a valve seat even if fuel is forced to slowly flow in the reverse direction by increase in pressure in the fuel tank after the fuel tank becomes full, thereby making the function of preventing backflow of fuel more complete. Thus, it is possible to provide a check valve which is reduced in cost by heightening the production efficiency and improved in performance to be cost-effective.

What is claimed is:

1. A check valve of a fuel tank, which is put in the closing state except oil feeding time to prevent fuel from flowing in the reverse direction from a fuel tank toward an oil filler port in an oil filler pipe, and so constructed that a valve element comprises three members: a pressing plate; an annular packing and a cover, said pressing plate and said cover are provided with locking means for assembling with each other, a flexible flange for bringing said valve element into pressure contact with the peripheral edge of a valve seat in the valve closing state is formed on the outer periphery of said annular packing, a peripheral stepped part to which the outer periphery of said pressing plate is fitted is formed on the inner periphery thereof, a peripheral wall to which the main body part of said annular packing except said flange is fitted is formed on the outer periphery of said cover, said annular packing is fitted to said cover, said pressing plate is fitted to said annular packing, and said annular packing is clamped with said cover and said pressing plate to be integrated by said locking means.

2. A check valve of a fuel tank as claimed in claim 1, wherein said locking means for said three members comprises a snap fit claw provided substantially in the center of said pressing plate and a fitting hole for said snap fit claw provided substantially in the center of said cover, whereby said annular packing is clamped with said cover and said pressing plate to be integrated by fitting said snap fit claw in said fitting hole.

3. A check valve of a fuel tank as claimed in claim 1, wherein said locking means for said three members comprises a projection provided substantially in the center of said pressing plate and a fitting hole for said projection provided substantially in the center of said cover, whereby said annular packing is clamped with said cover and said pressing plate to be integrated by welding or bonding the vicinity of the tip of said projection projected from said fitting hole to said cover.

4. A check valve of a fuel tank as claimed in claim 1, wherein said valve element is journalled to the valve seat side by a turning shaft bearing hole provided on the upper side of said valve element, and said turning shaft bearing hole is made as an elongated hole such that in the valve closing state, said valve element is closer to said valve seat to make said annular packing closely adhere to said valve seat.

5. A check valve of a fuel tank as claimed in claim 1, wherein said valve element is journalled to a turning shaft on the valve seat side by a turning shaft bearing hole provided on one side of said valve element, one end of a torsion coil spring installed on said turning shaft for energizing said valve element in the closing direction is brought into contact with the valve seat side, and the other end is fitted in a slot of said snap fit claw projected from said cover or a locking groove provided in the vicinity of the tip of said projection, thereby fitting and positioning said torsion coil spring.

* * * * *